United States Patent [19]
Julius

[11] Patent Number: 6,080,333
[45] Date of Patent: Jun. 27, 2000

[54] COMPOSITION TO DETOXIFY AND TO CONVERT GLUTARALDEHYDE IN GAZEOUS

[76] Inventor: Gabriel Julius, 9843 Forbes Ave., Northridge, Calif. 91343

[21] Appl. No.: 09/396,507

[22] Filed: Sep. 15, 1999

[51] Int. Cl.⁷ .............................. C09K 3/00; B01D 17/06; C02F 1/70
[52] U.S. Cl. .................. 252/190; 252/193; 210/749; 210/757
[58] Field of Search .................... 252/190, 193; 210/749, 757

[56] References Cited

U.S. PATENT DOCUMENTS

| | | | |
|---|---|---|---|
| 3,400,079 | 9/1968 | Clifford et al. | 252/184 |
| 4,397,756 | 8/1983 | Lehmann | 252/182 |
| 4,443,354 | 4/1984 | Eian | 252/190 |
| 5,158,778 | 10/1992 | Donovan et al. | 424/488 |
| 5,480,643 | 1/1996 | Donovan et al. | 424/409 |
| 5,545,336 | 8/1996 | Wheeler | 210/757 |
| 5,622,696 | 4/1997 | Camiener | 424/75 |
| 5,837,159 | 11/1998 | Farkas et al. | 252/193 |
| 5,919,472 | 7/1999 | Trescony et al. | 424/422 |

*Primary Examiner*—Jill Warden
*Assistant Examiner*—La Toya Cross

[57] ABSTRACT

A chemical composition is disclosed herein for performing a neutralization of glutaraldehyde vapors, control of incidental releases, detoxification and disposal of spent or unused aqueous and/or non-aqueous glutaraldehyde solutions, and feasible conversion of the waste glutaraldehyde into a raw compound for the pharmaceutical industry. The composition is consisting essentially of an aliphatic 1,2-diketone, the diacetyl (or biacetyl) for reacting with glutaraldehyde vapors and with glutaraldehyde in aqueous and/or non-aqueous solutions; ammonium hydroxide for cross-linking with diacetyl and glutaraldehyde, and, beta-cyclodextrin for enhancing the cross-linking, for adjusting the conversion of glutaraldehyde, and for molecularly encapsulating polyethylene glycol and/or other ingredients.

2 Claims, No Drawings

COMPOSITION TO DETOXIFY AND TO CONVERT GLUTARALDEHYDE IN GAZEOUS

FIELD OF INVENTION

The present invention relates to the field of detoxification and neutralization of hazardous substances, and more particularly to a novel chemical composition incorporating a detoxifying combination of substances which effectively neutralizes toxic glutaraldehyde vapors, detoxifies glutaraldehydes in aqueous and non-aqueous unused or spent solutions, molecularly cross-links glutaraldehyde with an aliphatic 1,2-diketone and amine groups, and molecularly encapsulates ingredients such as polyethylene glycol.

BRIEF DESCRIPTION OF THE PRIOR ART

Glutaraldehyde (glutaric dialdehyde) is a liquid soluble in water and alcohol, volatile in steam. This compound is used as intermediate, fixative for tissues, cold sterilization of endoscopic instruments, rubber or plastic equipment which cannot be heat sterilized, cross-linking protein and polyhydroxy materials, and for tanning soft leathers. The antibacterial ability of glutaraldehyde originates from its reactivity toward amine groups of various microorganisms.

Its solutions in water are slightly acidic and stable for long time. This dialdehyde is toxic and irritant, even the disposal of low concentrated solutions has become a problem because of its toxicity. Currently available glutaraldehyde neutralizing products are intended for use with 2–4% solutions, if glutaraldehyde in higher concentrations is to be neutralized, it must be diluted before adding these neutralizers.

The proposed combination converts glutaraldehyde into feasibly recuperable, valuable pharmaceutical raw material. The author believes that the mechanism of the proposed combination's reaction with glutaraldehyde presents a novelty in the aldehyde chemistry.

Therefore the proposed composition not only offers an effective neutralizer of glutaraldehyde, but provides a new method of converting spent or waste glutaraldehyde into pharmaceutical raw materials.

SUMMARY OF THE INVENTION

The present invention provides a chemical composition that detoxifies glutaraldehyde in gaseous state, and in aqueous and non-aqueous solutions. The said composition also modifies the chemical activity of ingredients in glutaraldehyde solutions, such as polyethylene glycol, by molecular encapsulation, complexation and stabilization.

Therefore, it is among the primary objects of the present invention to provide an effective, reliable detoxifier for glutaraldehyde in aqueous/non-aqueous solutions of various concentrations. Another object of the present invention is to provide a highly feasible treatment of glutaraldehyde wastes, which yields a valuable pharmaceutical raw material.

Yet another object of the present invention is to provide a novel, highly effective neutralizer for the toxic glutaraldehyde vapors.

Still another object of the present invention is to offer environmental and occupational safety benefits in treating glutaraldehyde solutions of different concentrations.

The foregoing objects are achieved according to the invention by mixing the said composition with a glutaraldehyde solution.

DESCRIPTION OF THE PREFERRED COMPOSITION

The composition/formulation of the present invention which is believed to be novel is set forth with particularly in the appended claims. The present invention, both as to its organization and manner of operation, together with further objects and advantages thereof, may best be understood with reference to the following description.

The major component of the proposed composition which is employed for neutralization and conversion of glutaraldehyde vapors and of glutaraldehyde in aqueous and/or non-aqueous solutions, is the diacetyl (or biacetyl), an aliphatic 1,2-diketone. Diacetyl is present in butter and natural oils (e.g. lemongrass oil). It is used extensively as chemical intermediate for pharmaceuticals, and as odorant for tobacco and food products. This diketone, due to its bifunctionality (similar to bifunctional glutaraldehyde also with two reactive carbonyl groups) originated from the two carbon-oxygen double bond feature, and its susceptibility to attack by a nucleophile, it reacts with glutaraldehyde in the presence of ammonium hydroxide and beta cyclodextrin. The reaction occurs at room temperature and 760 mm Hg (normal) atmospheric pressure, and results in the formation of an alkyl-imidazole. Imidazole derivatives are largely used in pharmaceutical industry.

The bifunctional nature of both, diacetyl and glutaraldehyde, has an important consequence, each of their molecule can react with ammonium hydroxide and form crosslink with its molecules. Ammonium hydroxide is employed for catalyzing the diactyl-glutaraldehyde reaction and to crosslink into imidazole structure.

Beta cyclodextrin is employed in the proposed composition for enhancing diacetyl solubility, for molecular cross-linking of glutaraldehyde and constituents of proposed composition, and for molecular encapsulation of other ingredients, such as polyethylene glycol.

Beta cyclodextrin is a cyclic oligosaccharide with conical molecular structure and a central cavity. This feature of the molecule allows to form three-dimensional encapsulation and inclusion complexes with guest molecules, thereby modifying the apparent physical and chemical properties of the guest molecules the potential guest list for molecular encapsulation includes aliphatics, aldehydes, organic acids, aromatics, amines, and gases.

In one preferred embodiment of the invention, the effective amount of the composition to be added to one volumetric unit of glutaraldehyde solution includes 0.68 volumetric unit of diacetyl; 0.79 volumetric unit of ammonium hydroxide, and; 0.16 volumetric unit of beta cyclodextrin. The concentration of diacetyl has to be equal to the concentration of glutaraldehyde, the concentration of ammonium hydroxide has to be 2.4 times greater than the diacetyl's concentration, and the beta cyclodextrin's conc. is 0.1%. An effective amount is an amount of composition which reduces the concentration of glutaraldehyde to a predetermined threshold level in the treated solutions.

The effective amount in this embodiment is the amount of composition reduces glutaraldehyde to 6.6–7.0 parts per million residual concentrations.

While my above description contains many specifities, these should be not construed as limitations on the scope of the invention, but rather as an exemplification of one preferred embodiment thereof.

The novel composition set forth above may be produced in various embodiments. The exact amounts of the particular ingredients used in the composition may be varied, determining different yields of reduction/conversion.

Accordingly, the scope of invention should be determined not by the embodiment illustrated, but by the appended claims, and their legal equivalents.

What is claimed is:

1. A novel composition for chemical neutralization of glutaraldehydes in unused or spent aqueous and/or non-aqueous glutaraldehyde solutions of concentrations up to 50 volume or weight percent, comprising diacetyl, amnmonium hydroxide and beta-cylodextrin.

2. The formulation according to claim 1, wherein diacetyl solution is in an amount of 41.8% by volume of said composition (or 0.68 volumic unit added to 1.00 volumic unit of glutaraldehyde solution), ammonium hydroxide solution is in an amount 48.4% by volume of the said composition (or 0.79 volumic unit added to 1.00 volumic unit of glutaraldehyde solution), and beta-cyclodextrin (1% concentration) solution is in an amount of 9.8% by volume (or 0.16 volumic unit added to to 1.00 volumic unit of glutaraldehyde solution).

* * * * *

UNITED STATES PATENT AND TRADEMARK OFFICE
CERTIFICATE OF CORRECTION

PATENT NO. : 6,080,333
DATED : June 27, 2000
INVENTOR(S) : Gabriel Julius Farkas

It is certified that error appears in the above-indentified patent and that said Letters Patent is hereby corrected as shown below:

Column 1, line 2, change 'Julius' to - 'Farkas'.

Column 1, line 5, after "in gazeous" insert - ' state and in aqueous and non-aqueous solutions.

Column 1, line 6, after " Gabriel Julius" insert - 'Farkas'.

Signed and Sealed this

Third Day of April, 2001

Attest:

NICHOLAS P. GODICI

Attesting Officer     Acting Director of the United States Patent and Trademark Office